May 7, 1968    W. B. JONES    3,381,629
CUSHION MOUNTED BEARING ADAPTOR FOR RAILWAY TRUCKS
Filed July 1, 1965    2 Sheets-Sheet 1

INVENTOR
WALTER B. JONES

BY

ATTORNEY

May 7, 1968      W. B. JONES      3,381,629

CUSHION MOUNTED BEARING ADAPTOR FOR RAILWAY TRUCKS

Filed July 1, 1965      2 Sheets-Sheet 2

INVENTOR
WALTER B. JONES

BY

ATTORNEY

United States Patent Office 3,381,629
Patented May 7, 1968

3,381,629
CUSHION MOUNTED BEARING ADAPTOR FOR RAILWAY TRUCKS
Walter B. Jones, Columbus, Ohio, assignor to The Buckeye Steel Castings Company, Columbus, Ohio
Filed July 1, 1965, Ser. No. 468,905
3 Claims. (Cl. 105—218)

ABSTRACT OF THE DISCLOSURE

An elastomeric element arranged between each bearing assembly and a load bearing portion of associated frames of a railway truck. The elastomeric elements accommodate axial movements of the bearing assemblies of each axle and eliminate or reduce lateral impact which would otherwise be applied to the truck frames.

---

The present invention relates to trucks for railway vehicles and more particularly pertains to an assembly which includes a resilient element over each bearing assembly which serves to accommodate lateral movements between the bearing assemblies and the truck frames to reduce and substantially eliminate lateral shocks to the side frames resulting from "hunting" of the wheels.

The treads of railway wheels have a generally conical shape at one side of the flange. Each pair of wheels is rigid with an axle so that both wheels and their axle form a unit and move transversely of the longitudinal direction of the track as a consequence of the conical treads and flanges reacting with the rails to set up "hunting" movements of each pair of wheels and the axle therefor. Such action is virtually continuous. Railway vehicles equipped with plain friction bearings provide acceptable riding characteristics because clearance is provided in the bearings permitting the axle to shift transversely of the tracks by approximately one-half of an inch before the axle imparts any lateral motion to a side frame of the truck. Accordingly railway vehicles equipped with trucks having plain friction bearings have relatively good riding characteristics for the reason that lateral shocks resulting from "hunting" of the wheel assemblies has not been a problem.

The trend in the railway art is to employ anti-friction bearings which are suitable for mounting in trucks equipped with pedestal type side frames. Such bearing assemblies in current use allow but a few thousandths of an inch of relative movement of the axle with respect to the bearing housing so that "hunting" action of a set of wheels and the axle imparts lateral movement to the truck frame and through the bolster onto the vehicle body. The "hunting" action creates lading damage as a consequence of the lateral shocks applied to the truck side frames which is transferred to the bolster and onto the car body. There is excessive wear of the truck bolster and body bolster center plates as a consequence of the repeated lateral and turning action of the truck bolster with respect to the body bolster. There is excessive flange wear on the wheels as a consequence of the inability of the wheel sets to shift laterally with respect to the side frames of the truck.

It is an object of the invention to provide an elastomeric element between each bearing assembly and an associated portion of the truck frame which accommodates axial movements of the axle and its set of wheels by approximately a half an inch without imparting lateral shock to the truck and to thereby improve the riding characteristics of trucks equipped with available anti-friction bearing assemblies.

Another object of the invention is to provide resilient cushion means between the roof of the pedestal jaws of a truck side frame and the associated bearing assembly which will distort as a consequence of "hunting" of a pair of wheels and the axle therefor allowing the axle to shift axially without imparting an impact to the truck frame and thereby reduce lading damage and reduce wear on the truck bolster center plate and the body bolster center plate and to reduce wear on the wheel flanges and to provide cushion means which tends to return the wheel sets to the neutral position as a consequence of energy stored in the resilient cushion means.

Another object of the invention is to provide resilient means in association with the bearings of a railway truck serving to cushion the side frames from lateral and vertical shocks which originate at the wheels and as a consequence of irregularities in the tracks and to reduce impacts on the bearings and journals and improve the ability of the vehicle to negotiate curves in the tracks of short radii and to adapt railway vehicles for operation on such tracks without alterations in the draft and buffing structures of the vehicles.

Other objects and features of the invention will be appreciated and become apparent particularly to those skilled in the railway truck art as the present disclosure proceeds and upon consideration of the following detailed description taken in conjunction with the accompanying drawings wherein an embodiment of the invention is disclosed.

Figure 1:
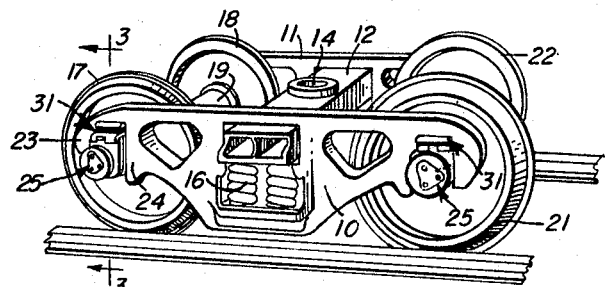
FIG. 1 is a perspective view of a truck for a railway vehicle embodying the invention.

The invention is directed to an assembly wherein an elastomeric element or unit is arranged between each bearing assembly and the frame of a railway truck. In the embodiment shown in the drawings the invention is embodied in a four-wheel truck as shown in FIG. 1 but it may be incorporated in other types of trucks. A typical four-wheel truck includes side frames 10 and 11 and a bolster 12 extending between and connecting the side frames. The load of the railway vehicle is imposed on the bolster center plate 14 by the body bolster center plate (not shown) and applied to the side frames through springs 16 in the usual manner. One set or pair of wheels 17 and 18 are rigidly mounted on an axle 19 and the other set or pair of wheels 21 and 22 are similarly joined by an axle (not shown). The side frames 10 and 11 are of the truss type and have pedestal jaws 23 and 24 which accommodate a bearing assembly 25 therebetween.

Figure 3:
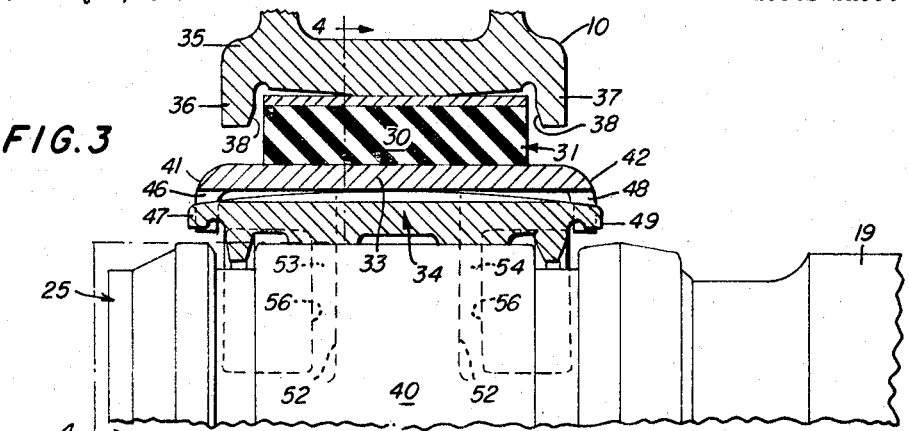
FIG. 3 is a partial sectional view taken on the line 3—3 of FIG. 1.
Figure 4:
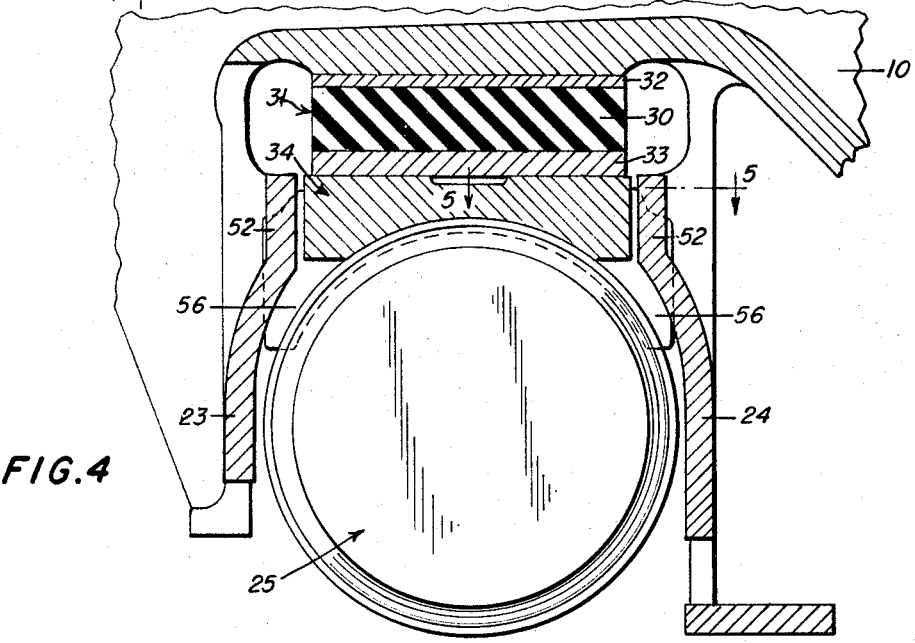
FIG. 4 is an elevational sectional view taken on the line 4—4 of FIG. 3.

In carrying out the present invention a resilient cushion element or unit 31 is provided between each bearing assembly 25 and the side frame where it extends over the associated pedestal jaws. The cushion unit 31 includes a pad 30 formed of resilient material such as rubber or synthetic rubber or any suitable plastic material. The resilient pad 30 may have a parallelpiped shaped and is desirably bonded to the underside of an upper plate 32 and to the upper face of a bottom plate member 33. The bonding may be carried out in vulcanizing process or in any other suitable manner. The cushion unit 31 is arranged between an adapter element 34 and the side frame 10 as best shown in FIGS. 3 and 4. The portion 35 of the side frame over the pedestal opening may be provided with ribs 36 and 37 as shown in FIG. 3 which depend along the sides of the cushion unit 31. The inner lower portions of the ribs 36 and 37 may be chamfered as shown at 38 to accommodate lateral displacements of the pad 30 of the cushion unit.

Figure 2:
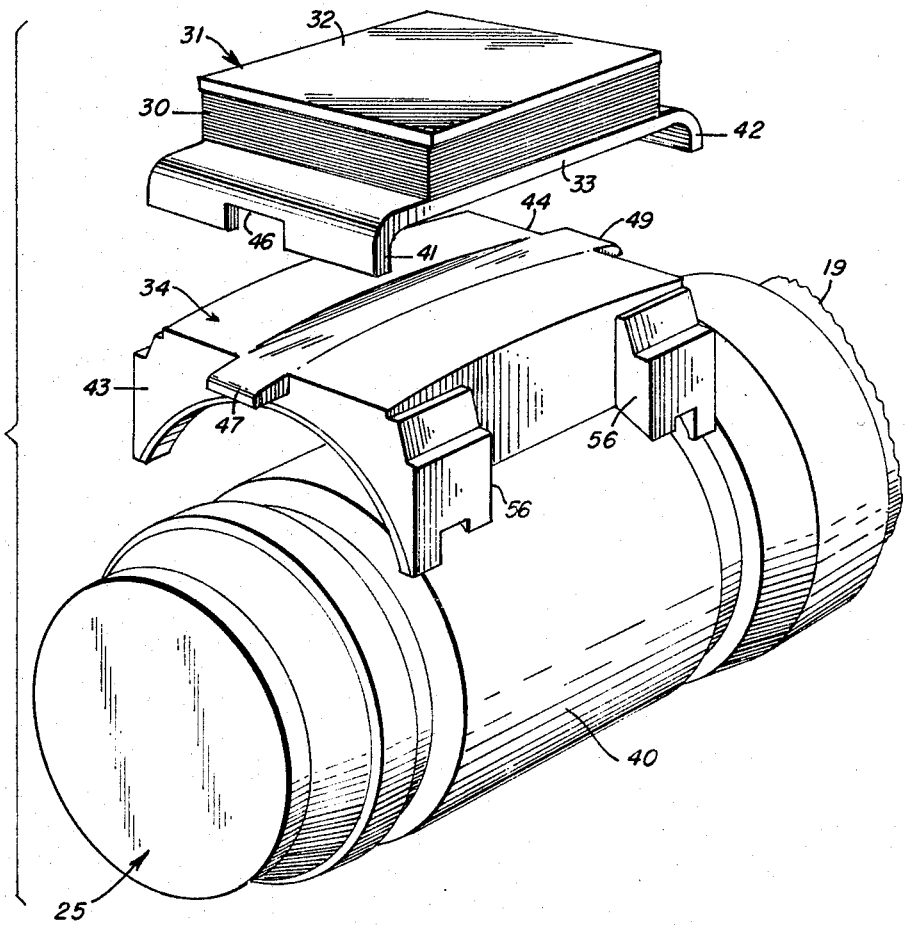
FIG. 2 is an exploded perspective view on a larger scale illustrating one of the cushion units employed in the truck shown in FIG. 1 and its relationship to a bearing assembly.

The adapter element 34 fits over the bearing housing 40 and the bottom plate member 33 of the cushion unit 31 rests on the slightly convex upper surface of the adapter element 34. The bottom plate member 33 is provided with depending flanges 41 and 42 as best shown in FIG. 2. These flanges depend along the end surfaces 43 and 44 of the adapter element 34 and serve to prevent lateral movements of the cushion unit 31 with respect to the adapter element. A notch 46 is formed in the depending flange 41 to receive the lug 47 on the adapter element. A similar notch 48 (FIG. 3) is provided for receiving the lug 49 on the adapter element.

Figure 5:
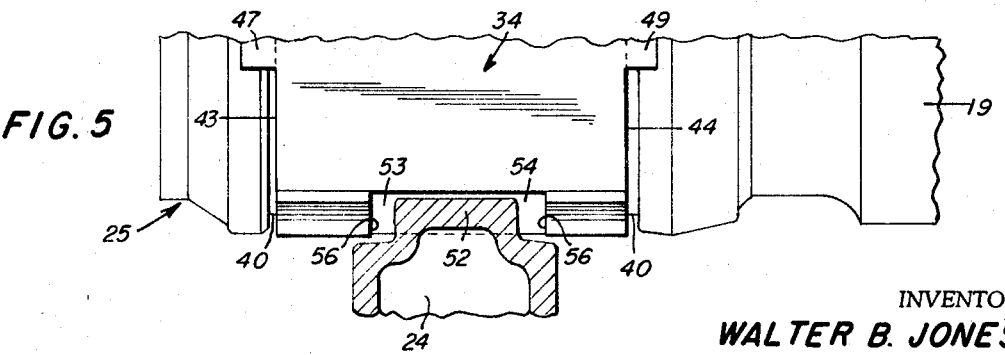
FIG. 5 is a fragmentary sectional view taken on the line 5—5 of FIG. 4.

Thrust lugs 52 on the pedestal jaws 23 and 24 are in accordance with the present invention formed of less width measured transversely of the side frame than conventional thrust lugs and allow the adapter element 34 to move laterally of the truck with the axle in response to "hunting" action of the wheels. The clearance as indicated at 53 and 54 at each side of the thrust lug 52 (FIG. 5) is such as to permit the adapter element 34 and the associated bearing housing 40 and the axle 19 to move a predetermined amount from its centered position with respect to the side frame. As a safety measure the thrust lugs 52 extend upwardly towards the roof of the pedestal a distance sufficient to maintain abutting relationship with the guide surfaces 56 on the adapter element 34 under all service conditions to which the resilient cushion unit 31 may be subjected.

In operation any movement of one set of wheels such as 17 and 18 and their axle 19 in a direction transversely of the track will move the bearing housing 40 transversely of its side frame because of the absence of any substantial free movement between the axle and the bearing assembly. The adapter element 34 accordingly moves with the bearing housing 40. Such movement causes the bottom plate member 33 to move with the adapter element 34 and the resilient pad 30 will be distorted in shear while accommodating axial movement of the axle 19 with respect to the side frame. The set of wheels 17 and 18 may thus move transversely of the side frames as permitted by the clearance at 53 or 54 between the thrust lug 52 and the guide surfaces 56 on the adapter element 34. This clearance is such as to accommodate approximately one-half inch axial movement of the axle before any uncushioned impact is imparted to the side frame. The "hunting" action of the wheels is thus accommodated without blows to the center plates is greatly reduced and lateral shifting of the wheels does not transmit shock to the vehicle body and lading damages are accordingly reduced. In a like manner the wear on the wheel flanges is reduced and the irregularties of the track are not transmitted to the side frames but absorbed in the cushioning units. Axial movements of the axle 19 after a few thousandths of an inch of movement relative to the side frame shifts the adapted element 34 and the bottom plate member 33 is moved laterally relative to the top plate 32. The resilient pad 30 is thus displaced transversely of the side frame and the resilient material is distorted in shear. The energy stored in the pad 30 serves to return each set of wheels and its axle to the neutral position. The elastomeric pads 30 in association with the bearings 25 of a truck accommodate irregularities in the track and permits trucks to negotiate curves of short radius.

While the invention has been described with reference to a particular type of cushion unit in association with one type of truck for a railway vehicle it will be appreciated that changes may be made in the cushion unit as well as the associated parts which adapt it to the truck frames and the bearings. Such modifications and others may be made and the cushion elements may be incorporated in other types of trucks without departing from the spirit and scope of the invention as set forth in the appended claims.

What I claim and desire to secure by Letters Patent is:

1. In a truck for a railway vehicle, a set of wheels and an axle rigidly joining said wheels, a bearing assembly at each end of said axle, a side frame having pedestal jaws accommodating therebetween one of said bearing assemblies, a side frame having pedestal jaws accommodating the other bearing assembly therebetween, an adapter element overlying and engaging each bearing assembly, a downwardly facing surface on each side frame above the associated adapter element, an upper plate under and engaging each downwardly facing surface, a resilient pad under each upper plate bonded to the underside of the associated upper plate, a bottom plate member overlying and engaging each adapter element having its upper face bonded to the associated pad, ribs carried by each side frame depending along sides of the associated upper plate, flanges carried each bottom plate member depending along sides of the associated adapter element, and the lower portion of each pad being displaceable laterally of the associated side frame accommodating axial movements of the associated bearing assembly with respect to its side frame.

2. In a truck for a railway vehicle according to claim 1 wherein the inner lower portions of said ribs are chamfered.

3. A resilient cushion unit allowing axial movements of bearing assemblies of a railway vehicle truck with respect to the side frames comprising, a generally parallelpiped shaped resilient pad, an upper plate overlying said pad with its underside bonded to said pad, a bottom plate member under said pad and having its upper face bonded to said pad, and a flange carried by opposite sides of said bottom plate member depending below the plane of the under surface of the bottom plate member.

References Cited

UNITED STATES PATENTS

| | | | |
|---|---|---|---|
| 481,704 | 8/1892 | Peckham | 105—223 |
| 3,211,112 | 10/1965 | Baker | 105—224.1 |
| 3,274,955 | 9/1966 | Thomas | 105—224.1 |
| 3,276,395 | 10/1966 | Heintzel | 105—224.1 |

FOREIGN PATENTS

| | | |
|---|---|---|
| 14,653 | 4/1904 | Norway. |

ARTHUR L. LA POINT, *Primary Examiner.*

H. BELTRAN, *Assistant Examiner.*